Feb. 9, 1932.  S. E. SHEPPARD ET AL  1,844,717
PROCESS FOR PRECIPITATING CELLULOSE ACETATE
Filed Jan. 3, 1929
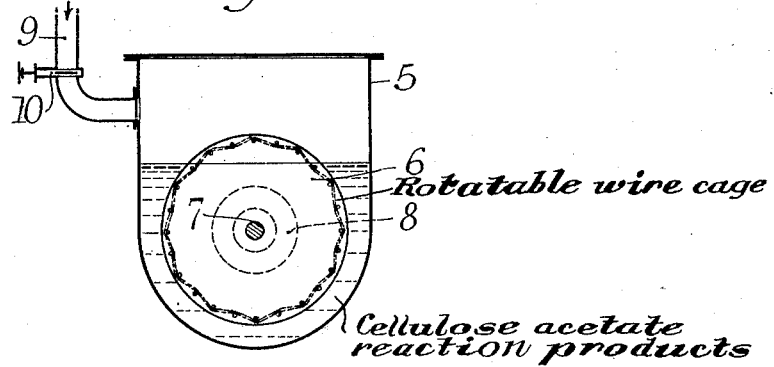
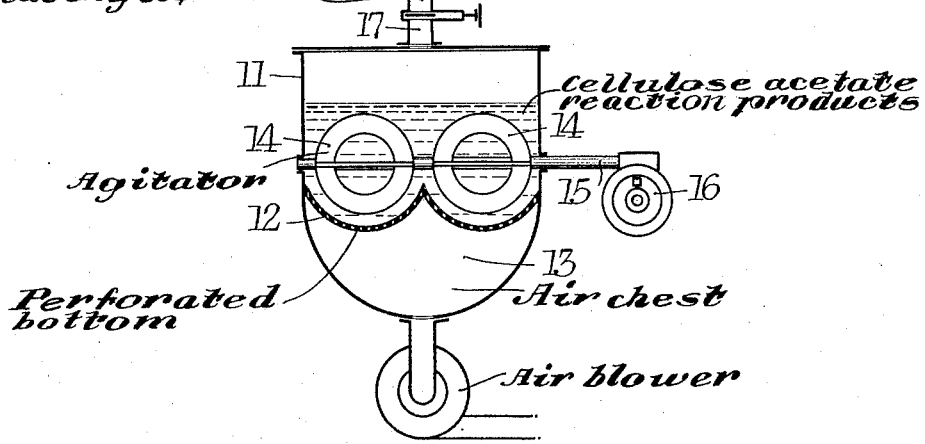
Inventors,
Samuel E. Sheppard & Leon W. Eberlin
By N. M. Perrins
Attorney Patented Feb. 9, 1932

1,844,717

UNITED STATES PATENT OFFICE

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK

PROCESS FOR PRECIPITATING CELLULOSE ACETATE

Application filed January 3, 1929. Serial No. 330,019.

This invention relates to cellulose acetate and particularly to a method of separating cellulose acetate from reaction mixtures.

Cellulose acetate is prepared by the action of acetic acid on suitable cellulosic material, for example cotton linters, in the presence of a catalyst and acetic anhydride. The cellulose acetate is generally designated as "first stage" or triacetate and may be modified by partial hydrolysis to produce a so-called "second stage" acetate which is soluble in acetone. The product in either case is a more or less viscous mass consisting of cellulose acetate in solution, or partial solution, with acetic acid and various by-products of the reaction. To secure the cellulose acetate in a substantially pure condition suitable for commercial applications, it is necessary to precipitate and to free the precipitated cellulose acetate from contaminating constituents by washing. Successful removal of the acetic acid and other materials depends upon the production of a finely divided and porous precipitate.

The precipitation can be effected by pouring the reaction mixture into water, but the product thus obtained is lumpy and therefore not adapted for washing. Furthermore, the more viscous material sometimes obtained as the result of the reaction cannot be readily poured. To avoid the difficulty experienced in precipitating cellulose acetate in the manner described, a method has been devised by Farrow, (Patent No. 1,560,554) which depends upon the gradual addition of water to the reaction mixture while it is undergoing agitation. This process produces a very satisfactory precipitate.

It is the object of the present invention to provide a method of precipitating cellulose acetate whereby a more finely divided and porous precipitate is obtained, the precipitate being more readily amenable to washing and other purification operations, the resulting product being superior to the product otherwise obtainable.

Our method depends upon the introduction and dissemination of air through the reaction mixture during the gradual addition of water and while the mixture is violently agitated. We have found that the active aeration of the mixture during the precipitation of the cellulose acetate produces a precipitate in a condition of extremely fine subdivision, the particles being permeated with microscopic and semi-microscopic pores which facilitate the subsequent washing to remove contaminating constituents from the cellulose acetate.

The method is conducted by adding water or weak acetic acid to the viscous reaction mixture while the latter is violently agitated. Air may be introduced concurrently in any suitable manner. It may be entrained for example by the agitating device which is adapted to draw air into and disseminate it through the mixture, or the receptacle in which the precipitation is conducted may be provided with a porous bottom through which air is introduced under pressure. The agitation insures dissemination of the water and acetic acid solution and of the air throughout the mass so that all of the material is subjected to the concurrent effect thereof to effect the desired precipitation.

The precipitating action is unique inasmuch as it proceeds in a manner quite different from that observed in precipitating cellulose acetate by methods heretofore in use. Under the conditions specified, as the water is introduced and disseminated through the mass it approaches a "breaking point" when the cellulose acetate commences to precipitate. The precipitation proceeds quite rapidly and uniformly throughout the mass in the form of a stable foam. As the precipitation proceeds, the foam cells become increasingly small to microscopic and sub-microscopic size. The first precipitate tends therefore to accumulate in, and ultimately as, the cell walls and angles until when a certain dilution of the acetic acid is reached the foam mass collapses to provide a finely divided suspension of solid cellulose acetate particles. The particles of cellulose acetate are very fine and porous and are in a condition therefore for separation and washing, the washing being readily accomplished by reason of the porous character of the particles. While the precipitate is sufficiently finely divided for most purposes, it may be, if desired, reduced to a still finer state of subdivision either by grinding in the precipitation liquid or after separation therefrom in water or in a dry state.

The porosity of the precipitated cellulose acetate may be increased by the addition of a suitable salt or by the presence thereof in the reaction mixture. Zinc chloride, for example, or other salts soluble in acetic acid, may be added in considerable amounts (up to 30% of the cellulose acetate). Alternatively, the precipitating diluent may instead of water or weak acetic acid consist of a saturated or nearly saturated solution in water or weak acetic acid of a salt such as sodium acetate or sodium sulphate. During the additions of the diluent the salt may commence to crystallize before the cellulose acetate is precipitated. It is however in a state of fine subdivision, and, owing to the viscous character of the mixture and to the agitation and aeration, the particles of the salt are maintained in suspension and are occluded in and interrupt the structure of the particles of cellulose acetate. When the cellulose acetate is separated and washed the solution of the salt particles effects a further disintegration and the washing of the cellulose acetate to remove contaminating constituents is facilitated.

The method may be conducted in any suitable type of mechanical agitator in which provision is made for the agitation of the mass and for the introduction of the diluent and of air. As examples of such apparatus, reference is made to the accompanying drawing in which Figure 1 is a sectional view of an apparatus adapted for the purpose and Figure 2 is a sectional view of another type of apparatus provided with a porous bottom.

Referring to Figure 1 of the drawings, "5" indicates a suitable receptacle adapted to receive the mixture, including the cellulose acetate and reaction products. An agitator "6", comprising a wire cage of ovoid shape, is connected to a shaft "7" which may be driven by a motor "8" or through a suitable connection to any suitable source of power. The cage "6" is perfectly articulated to the shaft "7" so that it is capable of moving about the axis of the shaft as the latter rotates, the cage being also rotatable with the shaft. The construction insures the thorough beating of the mass. The wire cage acts moreover as an aspirator to draw air into the mass and to disseminate it and thus securing the desired aerating effect. The diluent may be introduced through a pipe "9" which is supplied from any suitable source with water, weak acetic acid, or a solution containing a salt as hereinbefore described. The pipe is provided with a valve "10" to permit the regulation and the supply of diluent so that it may be introduced gradually as required to permit precipitation of the cellulose acetate in accordance with the desired procedure.

In Figure 2 of the drawings we have illustrated a different form of agitator, comprising a receptacle "11" having a porous bottom "12" of any suitable material which is adapted to withstand the effect of the acid which may be present. An air chamber "13" beneath the porous bottom supplied with air under pressure from the pump or other suitable source. The air is forced through the porous bottom and is distributed thus through the mass within the receptacle. An agitator, comprising blades "14" is connected to a shaft "15" which may be driven by a motor "16" or other source of power. The diluent is supplied through a pipe "17". The agitator churns the mass, and the violent agitation insures the dissemination of the diluent and of the air so as to effect precipitation of the cellulose acetate in a finely divided and porous condition.

The procedure as described produces a precipitate which is readily separable by filtration, centrifuging, or otherwise. The washing may be effected in any suitable apparatus after which the product can be dried. As hereinbefore indicated, the precipitate may be reduced by grinding either before or after precipitation, and such treatment can be carried out in any of the usual types of apparatus adapted for that purpose.

Various changes may be made in the procedure and the apparatus employed in conducting the operation without departing from the invention or sacrificing any of the advantages thereof.

Having thus described our invention, what we claim as new and desire to secure by Letters Patent is:

1. A process for the precipitation of cellulose acetate which comprises disseminating air into a solution containing cellulose acetate simultaneously with a liquid precipitant.

2. A process for the precipitation of cellulose acetate which comprises the gradual introduction of a diluent and dissemination of air into a solution containing cellulose acetate simultaneously with the precipitation thereof.

3. A process for the precipitation of cellulose acetate which comprises the gradual introduction of a diluent and by agitation disseminating air and diluent into a solution containing cellulose acetate simultaneously with the precipitation thereof.

4. A process for the precipitation of cellulose acetate which comprises introducing air into the reaction mass containing cellulose acetate during the precipitation thereof from the mass by means of a liquid precipitant.

5. A process for the precipitation of cellulose acetate which comprises introducing air into the reaction mass containing cellulose acetate and distributing and disseminating the air into the cellulose acetate simultaneously with the precipitation thereof by means of a liquid precipitant.

6. A process for the precipitation of cellulose acetate which comprises introducing air into the reaction mass during the gradual introduction of a diluent and disseminating the air and the diluent into the mass containing the cellulose acetate simultaneously with the precipitation thereof.

7. A process for the precipitation of cellulose acetate which comprises introducing air beneath the reaction mass during the gradual introduction of a diluent and by agitation disseminating the air and diluent into the mass containing the cellulose acetate simultaneously with the precipitation thereof.

8. A process for the precipitation of cellulose acetate which comprises disseminating air into a solution containing cellulose acetate simultaneously with the precipitation thereof by a precipitating agent containing in solution a salt which is soluble in the reaction mixture.

9. A process for the precipitation of cellulose acetate which comprises the gradual introduction of a diluent containing in solution a salt which is soluble in the reaction mixture and dissemination of air into the mass containing the cellulose acetate simultaneously with the precipitation thereof.

10. A process for the precipitation of cellulose acetate which comprises the gradual introduction of a diluent containing in solution a saturated solution of a salt which is soluble in the reaction mixture and by agitation disseminating air and diluent solution into the mass containing the cellulose acetate simultaneously with the precipitation thereof.

11. A process for the precipitation of cellulose acetate which comprises disseminating air by agitation into a solution containing the cellulose acetate simultaneously with the precipitation thereof by a precipitating agent containing a solution of a salt, the salt being soluble in the reaction mixture.

12. A process for the precipitation of cellulose acetate which comprises disseminating air into a solution containing cellulose acetate simultaneously with the precipitation thereof by a precipitating agent containing a solution of a salt, the salt being soluble in acetic acid.

13. A process for the precipitation of cellulose acetate which comprises disseminating air into a solution containing the cellulose acetate simultaneously with the precipitation thereof by a precipitating agent containing an aqueous solution of a salt, the salt being soluble in the reaction mixture.

14. A process for the precipitation of cellulose acetate which comprises disseminating air into a solution containing cellulose acetate simultaneously with the precipitation thereof by a precipitating agent containing a saturated salt solution, the salt being soluble in the reaction mixture.

15. A process for the precipitation of cellulose acetate which comprises disseminating air into a solution containing cellulose acetate simultaneously with the precipitation thereof by a precipitating agent containing a saturated salt solution, the salt being soluble in acetic acid.

16. A process for the precipitation of cellulose acetate which comprises disseminating air into a solution containing cellulose acetate simultaneously with the precipitation thereof by a precipitating agent containing an aqueous solution of sodium acetate.

17. A process for the precipitation of cellulose acetate which comprises disseminating air into a solution containing cellulose acetate simultaneously with the precipitation thereof by a precipitating agent containing a saturated aqueous solution of sodium acetate.

Signed at Rochester, New York, this 28th day of December, 1928.

SAMUEL E. SHEPPARD.
LEON W. EBERLIN.